(12) United States Patent
Kramer

(10) Patent No.: US 8,226,778 B2
(45) Date of Patent: Jul. 24, 2012

(54) DRIVE SYSTEMS FOR WAREWASHERS

(75) Inventor: Steven H. Kramer, Osgood, OH (US)

(73) Assignee: Premark FEG L.L.C., Wilmington, DE (US)

( * ) Notice: Subject to any disclaimer, the term of this patent is extended or adjusted under 35 U.S.C. 154(b) by 649 days.

(21) Appl. No.: 12/445,462

(22) PCT Filed: Oct. 4, 2007

(86) PCT No.: PCT/US2007/080360
§ 371 (c)(1),
(2), (4) Date: Apr. 14, 2009

(87) PCT Pub. No.: WO2008/051690
PCT Pub. Date: May 2, 2008

(65) Prior Publication Data
US 2010/0024850 A1 Feb. 4, 2010

Related U.S. Application Data

(60) Provisional application No. 60/853,251, filed on Oct. 20, 2006.

(51) Int. Cl.
*B08B 3/00* (2006.01)
(52) U.S. Cl. .................................... 134/58 D
(58) Field of Classification Search ................ 134/56 D, 134/57 D, 58 D
See application file for complete search history.

(56) References Cited

U.S. PATENT DOCUMENTS

| | | | |
|---|---|---|---|
| 1,637,376 A | 8/1927 | Gibney | |
| 2,151,354 A | 3/1939 | Osuch | |
| 2,702,042 A | 2/1955 | Smith | |
| 2,886,046 A | 5/1959 | Du Gal | |
| 3,106,217 A | 10/1963 | Henderson | |
| 3,292,645 A * | 12/1966 | Braden et al. | 134/57 D |
| 3,832,870 A | 9/1974 | Todd-Reeve | |
| 3,978,875 A | 9/1976 | Slany | |
| 4,237,912 A | 12/1980 | Hill et al. | |

(Continued)

FOREIGN PATENT DOCUMENTS

GB 2366843 3/2002

(Continued)

OTHER PUBLICATIONS

International Search Report and Written Opinion, PCT/US2007/080360 (Feb. 19, 2008).

(Continued)

*Primary Examiner* — Michael Barr
*Assistant Examiner* — David Cormier
(74) *Attorney, Agent, or Firm* — Thompson Hine LLP

(57) ABSTRACT

A warewash machine includes a housing defining at least one area for spraying liquid on wares. A conveyance mechanism is provided for moving wares through the housing from an input end to an output end of the housing. A drive system drives the conveyance mechanism. The drive system includes a drive motor (200) having an output shaft and a slip clutch assembly (202) connected between the output shaft and the conveyance mechanism. The slip clutch assembly (202) includes a torque input side, a torque output side, and an adjustment member (250) positionable in either a first orientation that sets a first pre-i selected slip clutch torque limit or a second configuration that sets a second pre-selected slip clutch torque limit that is different than the first pre-selected slip clutch torque limit.

17 Claims, 18 Drawing Sheets

U.S. PATENT DOCUMENTS

| | | | |
|---|---|---|---|
| 4,267,914 A | 5/1981 | Saar | |
| 4,508,212 A * | 4/1985 | Bolle et al. | 198/781.04 |
| 4,746,320 A | 5/1988 | Kilwin | |
| 5,259,889 A | 11/1993 | Payzant | |
| 5,311,894 A | 5/1994 | Payzant | |
| 6,012,567 A | 1/2000 | Ferguson et al. | |
| 6,056,667 A | 5/2000 | Sasaki | |
| 6,550,607 B1 | 4/2003 | Watson et al. | |

FOREIGN PATENT DOCUMENTS

| | | |
|---|---|---|
| JP | 06-278048 | 10/1994 |

OTHER PUBLICATIONS

International Preliminary Report on Patentability, PCT/US2007/080360 (Apr. 30, 2009).

* cited by examiner

DRIVE SYSTEMS FOR WAREWASHERS

CROSS-REFERENCE TO RELATED APPLICATIONS

This application claims priority to U.S. Provisional Application No. 60/853,251, entitled "Drive Systems for Warewashers," filed Oct. 20, 2006.

TECHNICAL FIELD

This application relates generally to pass through type warewashers which are used in commercial applications such as cafeterias and restaurants and, more particularly, to a drive system for moving wares through such warewashers.

BACKGROUND

Commercial warewashers commonly include a housing area which defines the washing and rinsing area for dishes, pots pans and other wares. A conveyor is used to transport the wares through the warewasher from an input side to an output side. At the output side of the warewasher a ware receiving table/trough may extend several feet to allow cleaned wares to exit from the warewasher completely before being removed by kitchen personnel.

U.S. Pat. No. 6,550,607 describes a warewasher including a conveyor drive arrangement including a jam detection system. The warewasher includes a conveyor drive arrangement including a drive motor assembly formed by a drive motor and reduction gear box, with the rotational axis of the assembly being substantially upright. The drive motor assembly includes a rotating output shaft. A rotatable slip clutch includes an input side operatively connected for rotation by the drive motor assembly output shaft, and an output side operatively connected for driving a dog-type conveyor. Specifically, the output side is connected with an upright shaft that extends to a crank arm. As the crank arm rotates in a clockwise direction (looking from top to bottom along the rotational axis) it repeatedly engages a drive block. The dog-type conveyor moves racks containing wares through the machine on tracks in a stop and go fashion with every rotation of the crank arm. The dogs are attached to a cradle that is suspended below the tracks on plastic slider blocks. The cradle is made to oscillate back and forth in the direction of arrow by the rotating crank arm and drive block, propelling the racks forward on every forward stroke of the cradle by way of the dogs engaging with webs on the bottoms of the racks. The drive block runs in a channel. During the reverse stroke of the cradle, the cradle dogs disengage from the rack webs (pivoting downward as they contact other webs on the reverse movement) and the racks remain stationary (commonly referred to as dwell time) until the next forward stroke of the cradle. In this arrangement, on average racks moved through the warewasher are generally stationary for the same duration of time that they are moving forward. That is, the rack must hesitate while the conveyor is returning to the drive position flooding some of the rack wear with wash and rinse water. During the driving of the rack, some ware is washed with a lesser amount of water. To overcome this lower amount of water, the wash and rinse system is designed to meet dish cleanliness criteria during the movement of the rack. The system is "over washing" the ware during the long stops as a result meaning that the wash and rinse system could be more efficient if a conveyor system with less dwell time were designed.

It is more effective to push/pull the racks through the warewasher at a more even rate (e.g., less stationary time) to ensure more even water distribution to the wares.

Several designs were considered for a constant motion conveyor system including a stainless steel drive chain and a chemical resistant belt. The stainless drive chain would do a fine job moving the rack but the current cost to implement such a system in a conveyor machine would be several times more expensive than that of a ratcheting conveyor. Corrosion resistant plating on a carbon steel chain would be available at a lesser cost but the long-term reliability would be an issue as the plating wore off the chain, which would lead to rust. The belt design is lower cost but belt materials do not currently exist at this time that can withstand the chemicals, heat, and hold tension in the machine to meet quality and reliability standards.

SUMMARY

In an aspect, a warewash machine includes a housing defining at least one area for spraying liquid on wares. A conveyance mechanism is provided for moving wares through the housing from an input end to an output end of the housing. A drive system drives the conveyance mechanism. The drive system includes a drive motor having an output shaft and a slip clutch assembly connected between the output shaft and the conveyance mechanism. The slip clutch assembly includes a torque input side, a torque output side, and an adjustment member positionable in either a first orientation that sets a first pre-selected slip clutch torque limit or a second configuration that sets a second pre-selected slip clutch torque limit that is different than the first pre-selected slip clutch torque limit.

In another aspect, a warewash machine includes a housing defining at least one area for spraying liquid on wares. A conveyance mechanism moves wares through the housing from an input end to an output end of the housing. A drive system drives the conveyance mechanism. The drive system includes a drive motor having an output shaft and a slip clutch assembly connected between the output shaft and the conveyance mechanism. The slip clutch assembly includes a torque input side, a torque output side, a clutch plate on the torque input side, a clutch arm member on the torque output side, and a releasable connecting structure releasably connecting the clutch arm member for rotation with the clutch plate. The releasable connecting structure includes a quick change plate having first and second sides, such that when the slip clutch assembly is assembled with the first side of the quick change plate facing the clutch plate a first slip clutch torque limit is defined and when the slip clutch assembly is assembled with the second side of the quick change plate facing the clutch plate a second slip clutch torque is defined. The second slip clutch torque limit is different than the first slip clutch torque limit.

In another aspect, a method of setting up a drive system that drives a conveyor assembly of a warewash machine is provided. The method includes linking a drive motor to the conveyor assembly through a slip clutch assembly. An adjustment member is provided on the slip clutch assembly. The slip clutch assembly can be assembled in a first configuration with the adjustment member oriented to define a first pre-selected slip clutch torque limit, and the slip clutch assembly can be assembled in a second configuration with the adjustment member oriented to define a second pre-selected slip clutch torque limit. The slip clutch assembly is assembled in either the first configuration or the second configuration based upon desired slip clutch torque limit.

The details of one or more embodiments are set forth in the accompanying drawings and the description below. Other features, objects, and advantages will be apparent from the description and drawings, and from the claims.

DETAILED DESCRIPTION

Several modified ratcheting systems have been developed and tested. The first design is a center drive dual ratchet. The dual ratchet has two drive arms. As one arm (A) is driving the rack, the second arm (B) is retracting. When the driving bar (A) starts to retract, the second arm (B) picks up the rack and starts pushing. This motion is achieved with a four bar linkage on the input drive motor. The benefit is that the rack only hesitates during the time it takes the dog on the (B) bar to engage the rack. Test results on this drive system have been very good. The rack is pushed through the system at a nearly continuous rate, the dishes are pushed to the exit tabling evenly, and the design is simple and reliable. However, rack wear tends to be increased.

Figure 1:
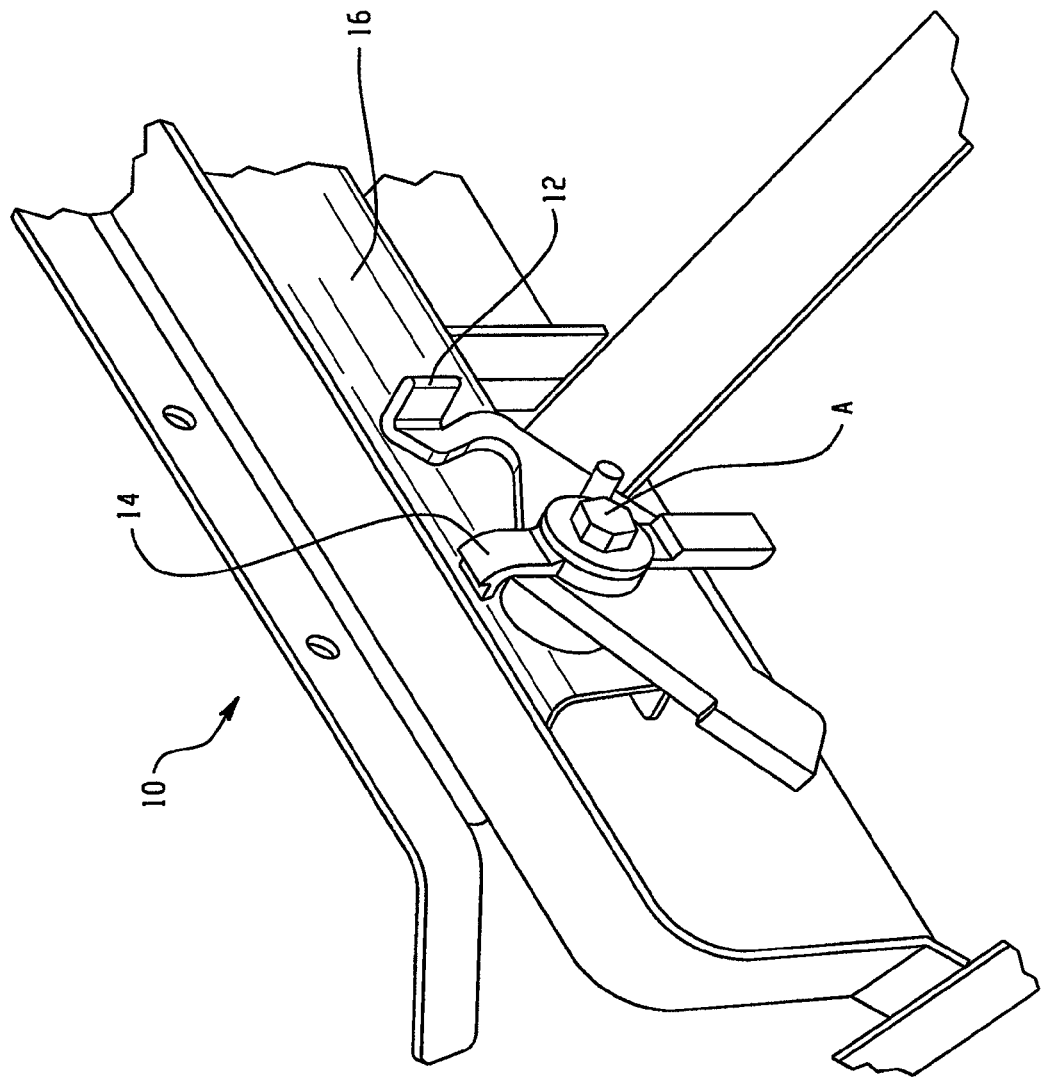
FIGS. 1 and 2 illustrate an embodiment of a double dog arrangement.
Figure 2:
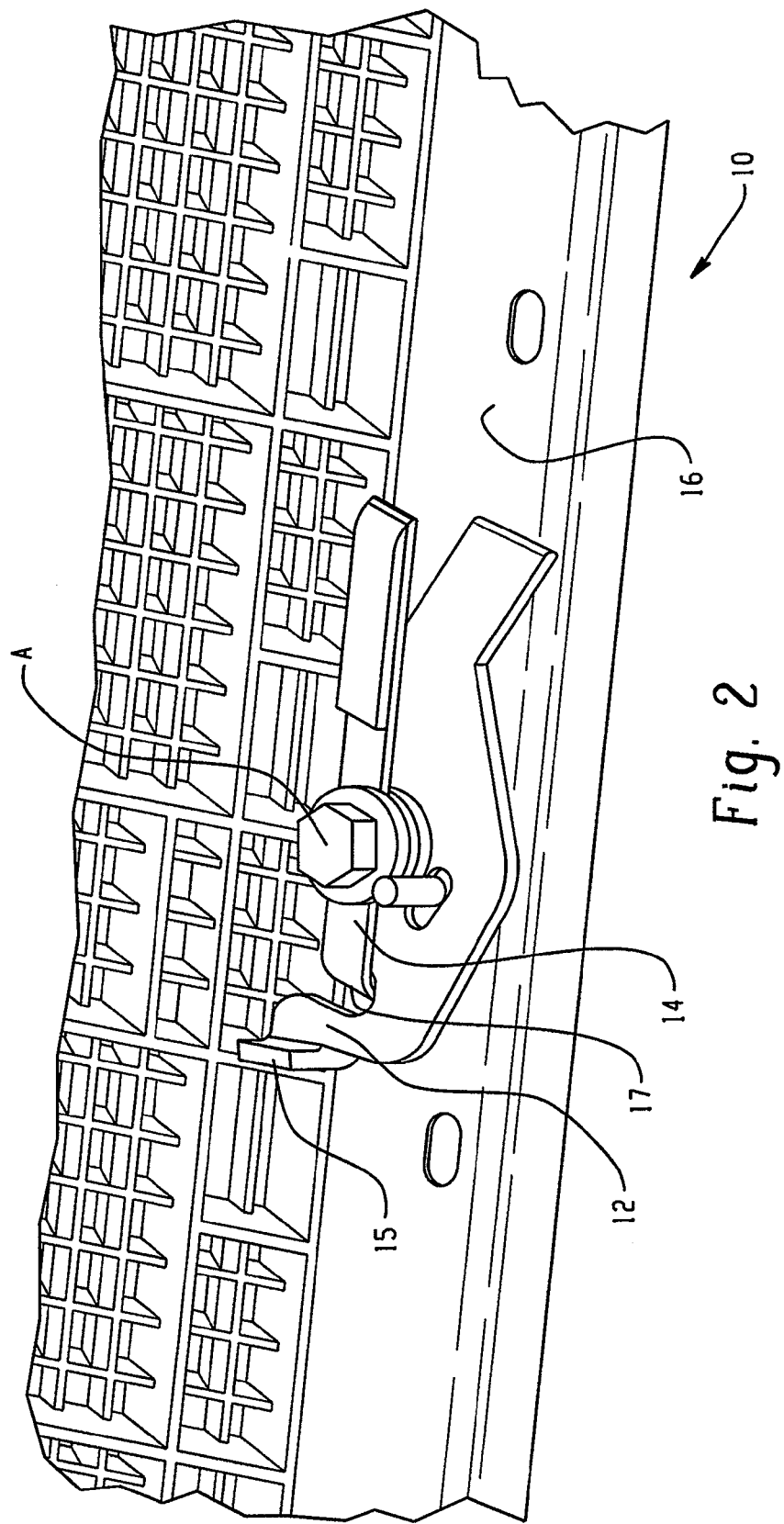
Figure 3:
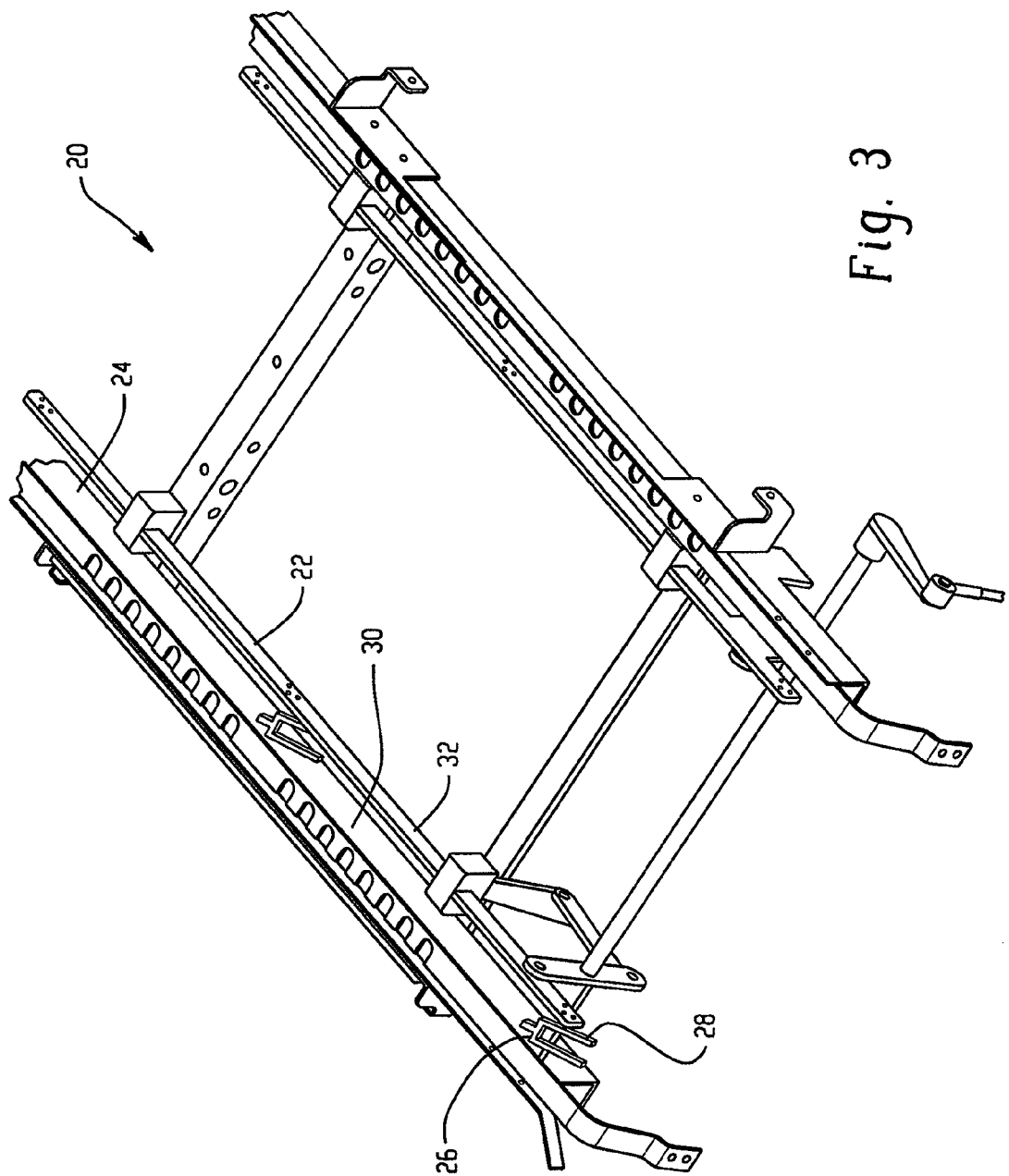
FIGS. 3-6 illustrate an embodiment of a dual ratchet system.
Figure 4:
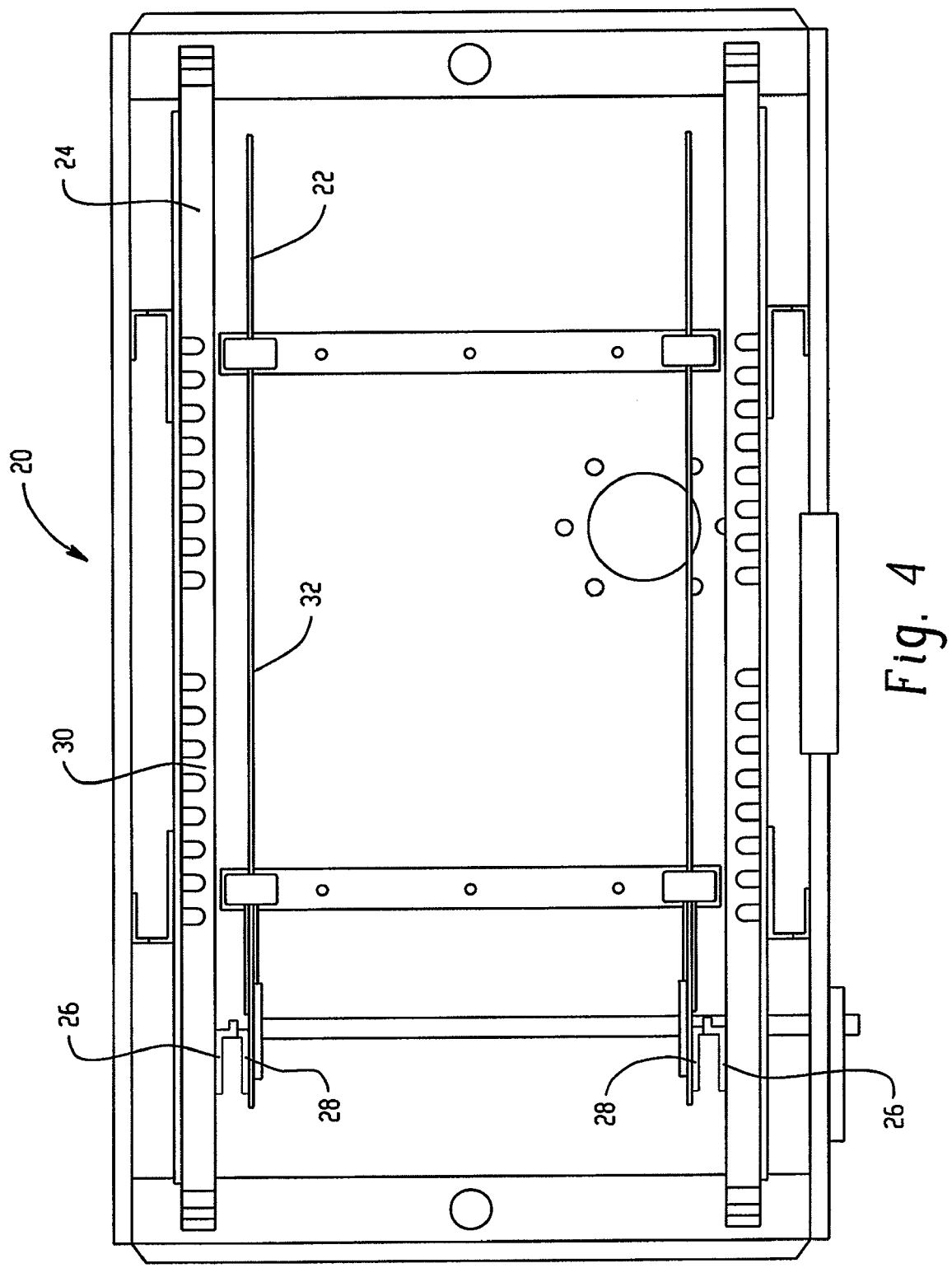

A "double dog" arrangement was considered per FIGS. 1 and 2. Two dogs are located on the same pivot axis and the stroke length of the cradle is shortened. The two dogs are arranged so that rack engaging portions of the two dogs are offset from each other along the travel distance through the warewasher. The first dog pushes the rack during a first forward stroke with the dog engaging a specific rack web. The cradle is reversed to a position where the second dog can engage the same web, then the cradle is again moved forward. The cradle is reversed again so that the first dog can catch the next web of the rack. The short, quick strokes of the double dog arrangement provide more starts and stops, and thus more consistent coverage as between wares on different portions of the racks. Still, the wares are generally stationary for the same amount of time they are moving forward. Also, the rapid movement of the conveyor mechanism could potentially result in premature part wear.

A "dual ratchet" system was considered per FIGS. 3-6. The dual ratchet system uses both an inner cradle and an outer cradle. When one cradle is driving racks forward, the other cradle is moving backward to move into position to make the next forward driving motion for the racks. Thus, dwell time for each rack is reduced significantly. Due to the narrowness of the web area on most dish racks, there is not enough drive area on the rack web to allow the dogs on the inner and outer cradle to pass by each other. Accordingly, the drive dogs are mounted and configured so that the driving dog will cause the backward moving dog to lay down generally flat to avoid interference. Complexity is an issue with this design, as it utilizes eight different drive links to drive the arms. This potentially leads to reliability issues in that joints will wear and pieces of washed ware could get into the system and cause a jam, shutting down the machine.

Rapid Return Conveyor

Figure 7:
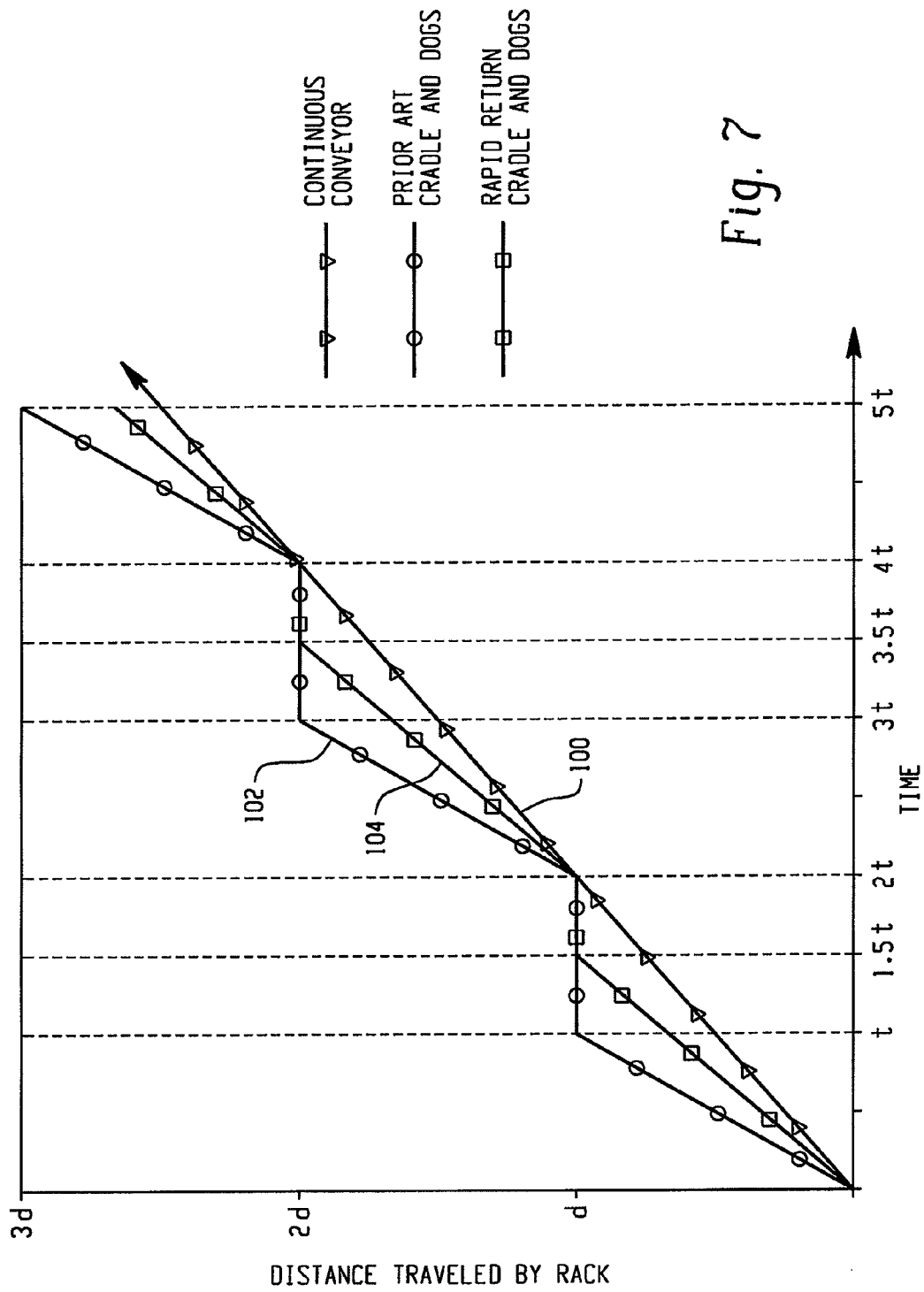
FIG. 7 shows an exemplary graph of a rack travel distance over time for a warewasher drive system in the nature of a rapid return system.
Figure 8:
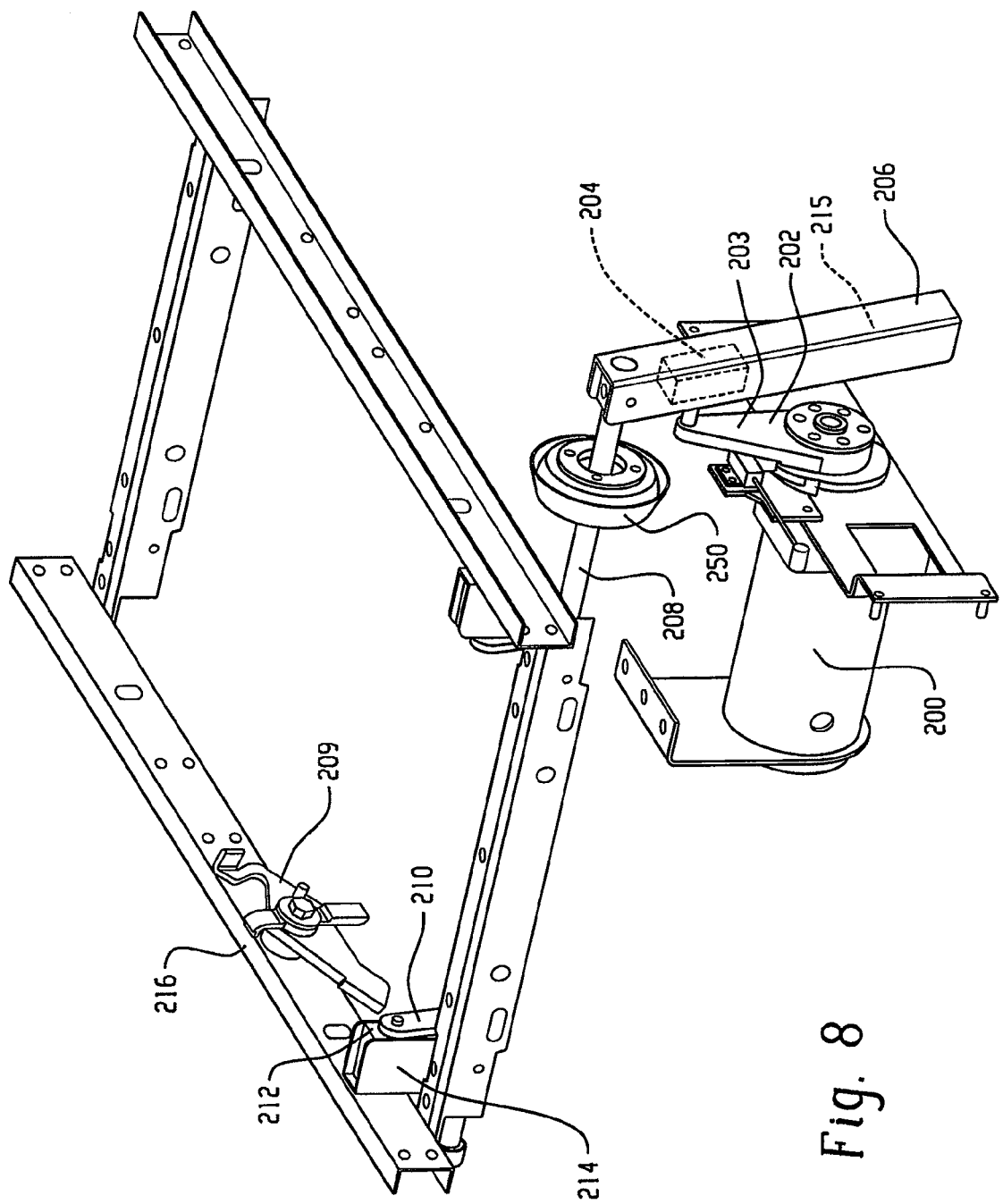
FIGS. 8-14 illustrate embodiments of various drive system elements.
Figure 9:
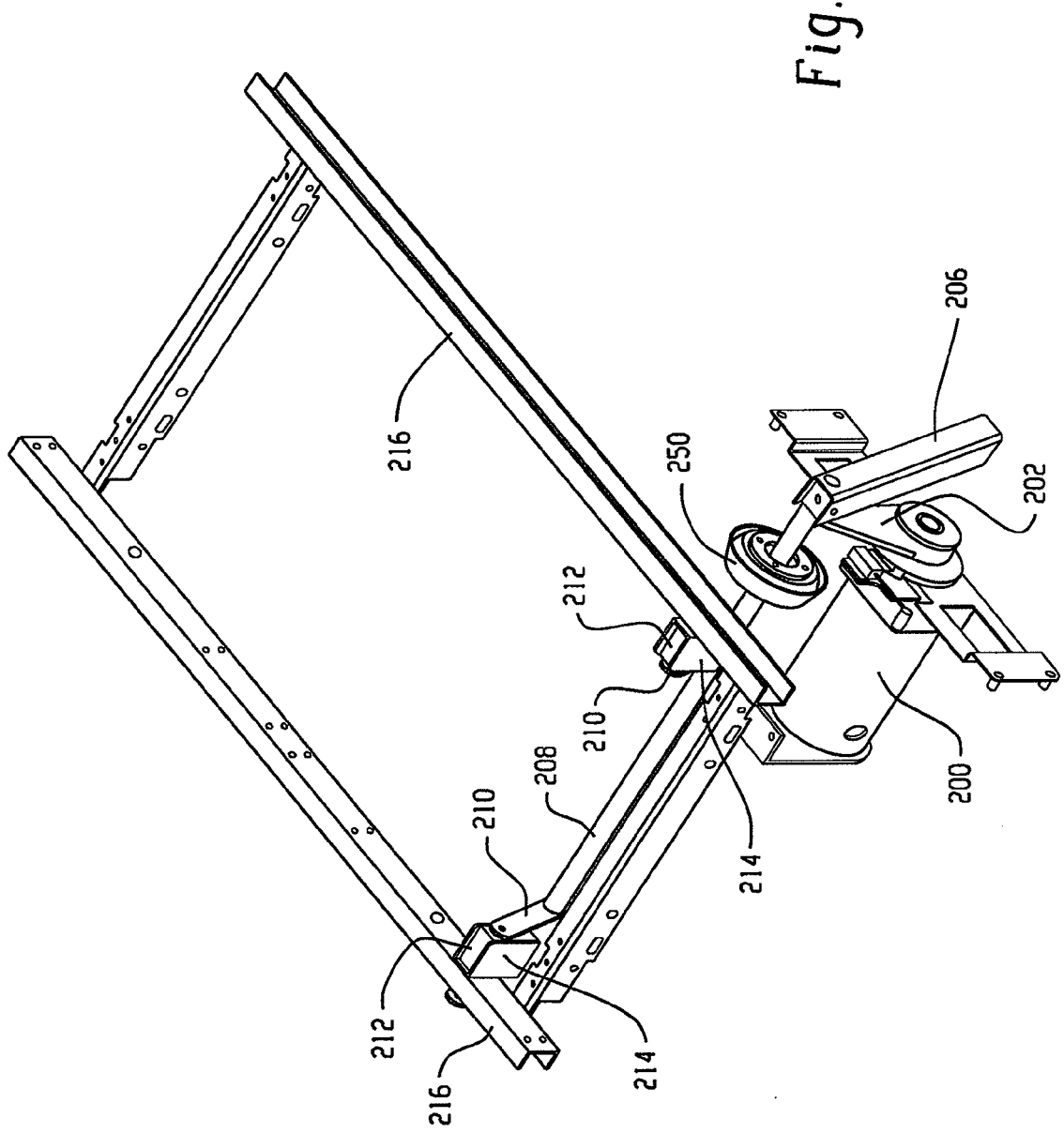
Figure 10:
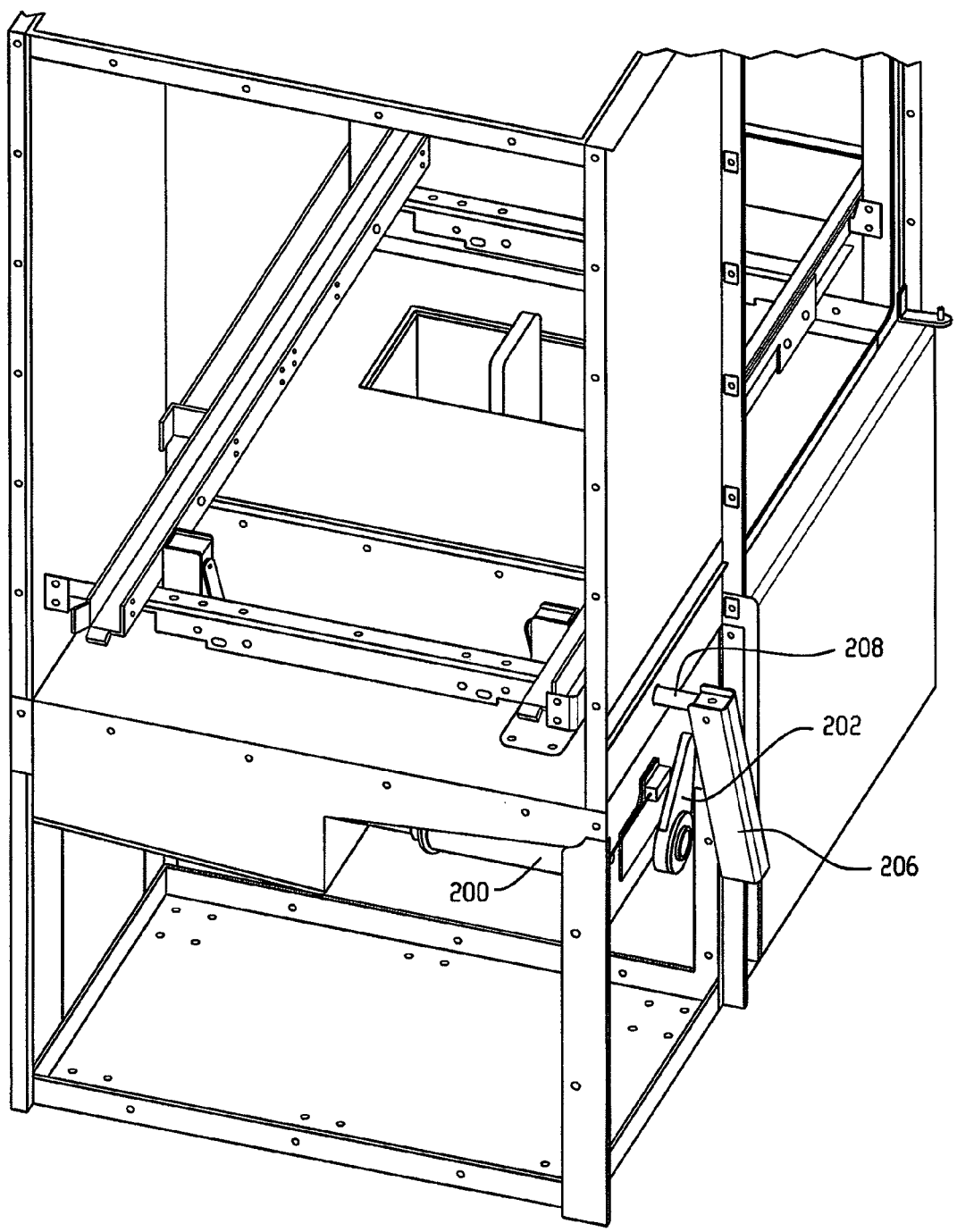
Figure 11:
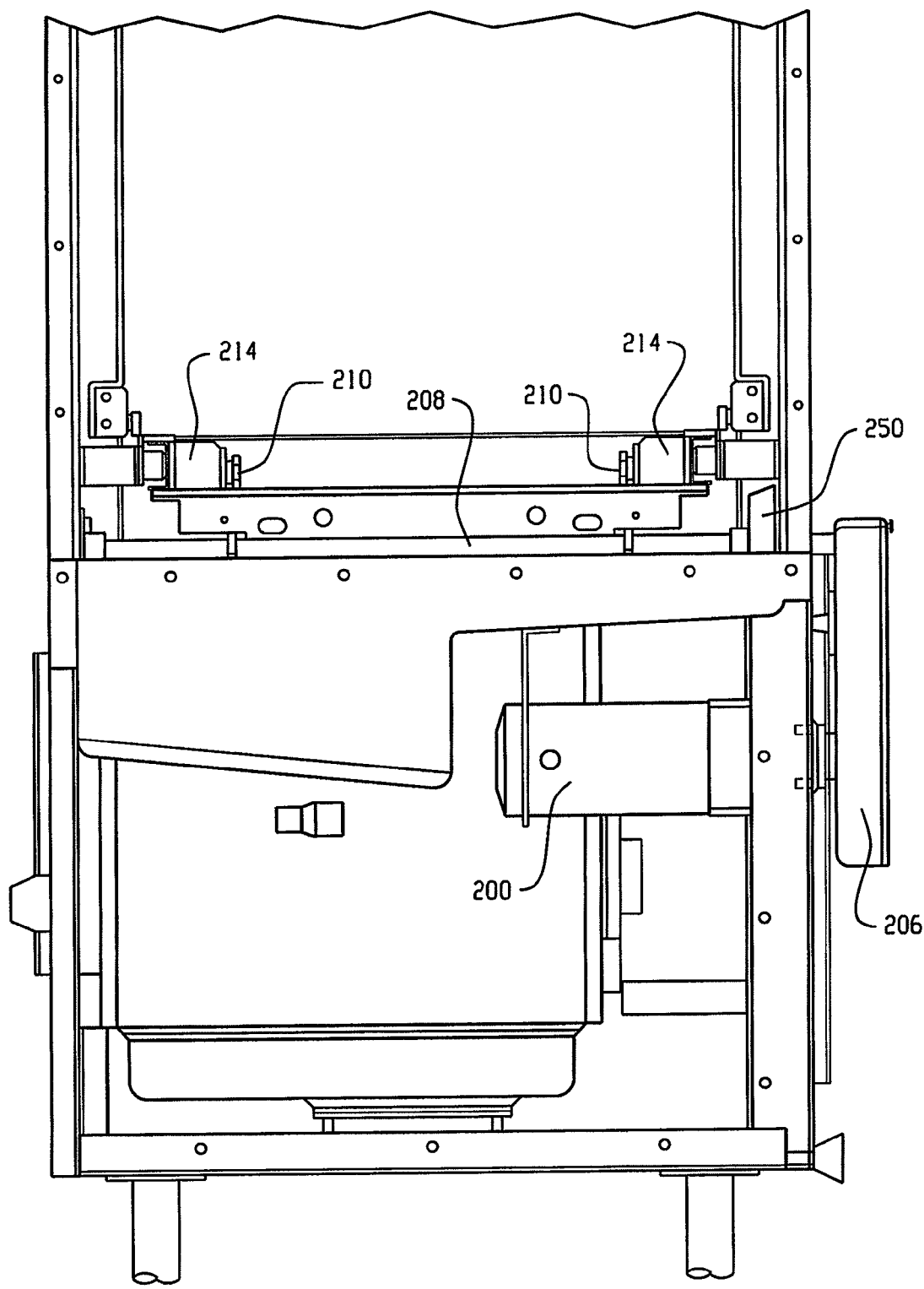
Figure 12:
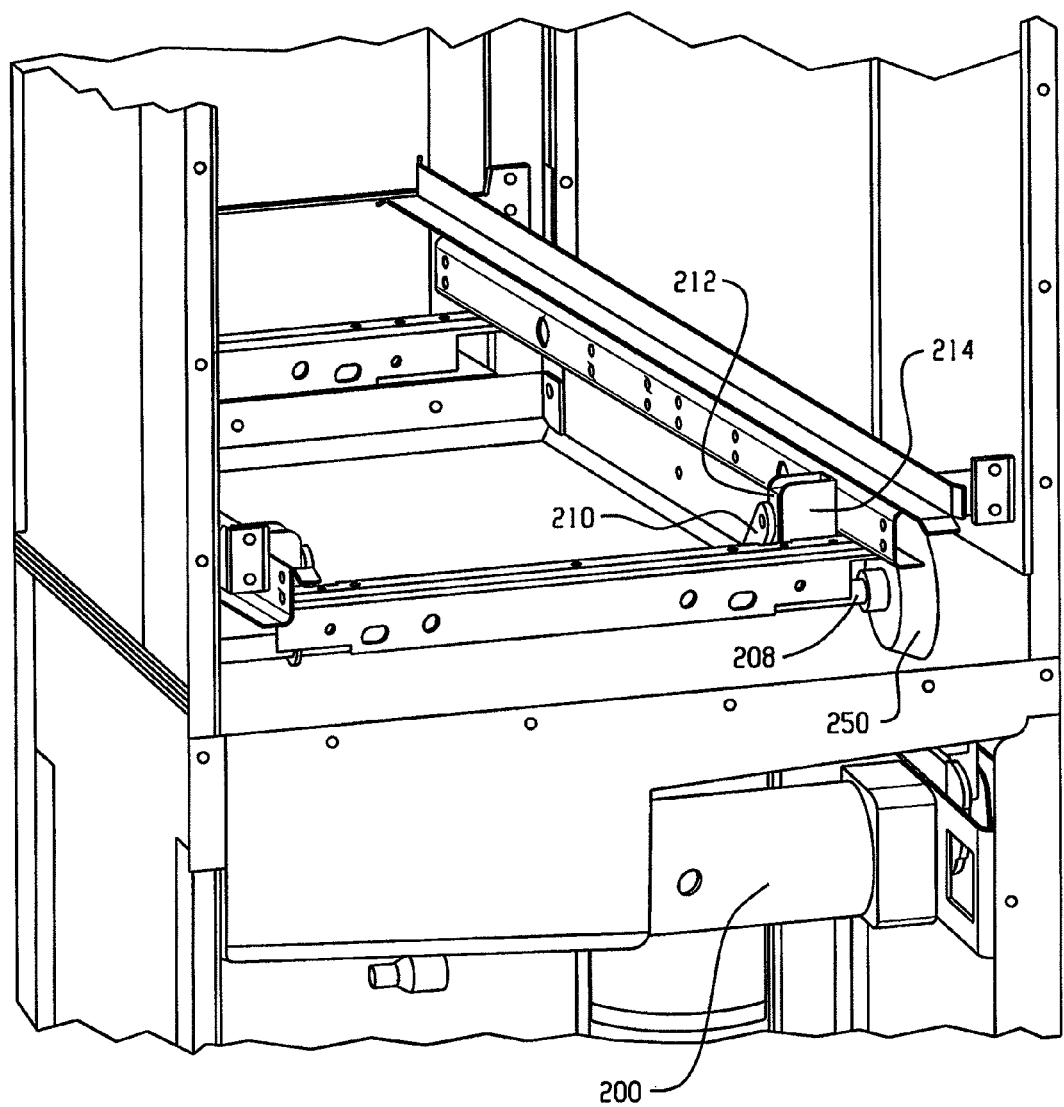
Figure 16:
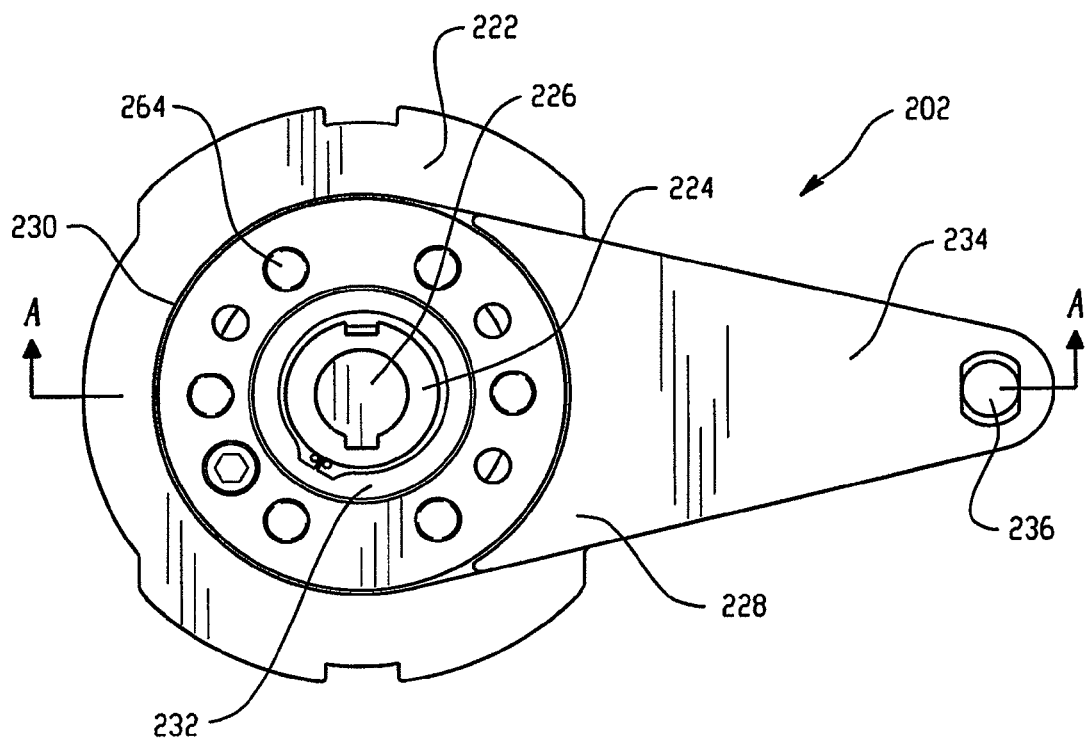
FIG. 16 is a top view of the slip clutch assembly of FIG. 15.

Referring now to FIG. 7, a warewasher drive system in the nature of a "rapid return" system is discussed. FIG. 7 shows an exemplary graph of rack travel distance over time. Curve 100 represents a continuous conveyor, curve 102 represents an rough approximation of a prior art cradle and dog drive (i.e., where rack dwell time is the same as the rack forward moving time, typical conveyor design) and curve 104 represents a rough approximation of the concept of a rapid return conveyor. In curves 102 and 104, while rack movement is depicted in straight-line, constant-slope form (e.g., the rack movement depicted in curve 102 between time 2t and time 3t or the rack movement depicted in curve 104 between time 2t and time 3.5t), in reality rack movement would necessarily involve some acceleration and deceleration so that the line would not be of constant slope. Moreover, in a drive arrangement that converts rotary motion of a crank into back and forth pivotal motion of a shaft, which is then converted into back and forth linear motion (as in the embodiment described below using slide blocks) the resulting speed would not be linear. In this graph the curves are depicted linear for the sake of understanding. FIG. 16 shows an exemplary conveyor speed curve to one implementation of the embodiment of the rapid return conveyor described below, where negative speed values reflect the return or backward movement of the conveyor and positive speed values reflect the forward movement of the conveyor.

In the rapid return conveyor concept, the conveyor is still repeatedly ratcheted forward and backward, but the rack dwell time is reduced significantly by moving the conveyor (e.g., cradle and dogs) backward substantially faster than the conveyor is moved forward. In the graph of FIG. 7 the conveyor moves forward about 75% of the time, and backward only about 25% of the time. Variations on this breakdown are possible. While the rapid return feature could be implemented using many different conveyor configurations, the following embodiment is described with respect to a cradle and dog conveyor.

Referring now to FIGS. 8-14, basic drive system elements of this embodiment include a drive motor 200 that effects rotation of a slip clutch assembly 202. The slip clutch assembly 202 (which may be part of a jam detection system) is pivotally connected to a slide block 204 (shown in shadow) providing a linking member to effect back and forth arcuate movement of a drive channel 206 along which the slide block travels. The drive channel 206 is connected with a drive shaft 208 that includes spaced apart brackets 210 extending therefrom. Each drive bracket 210 is pivotally connected with a corresponding slide block 212 that moves within a corresponding channel guide 214 that is connected to the cradle side rail 216. When the drive shaft 208 is rotated clockwise (when viewed from the end of the shaft that is connected to the drive channel 206) the brackets 210 rotate in the forward direction (relative to the path of travel through the warewasher) causing the slide blocks to interact with the channel guides 214 and move the cradle and its dogs (not shown) forward. Conversely, when the drive shaft 208 is rotated counterclockwise (when viewed from the end of the shaft that is connected to the drive channel 206) the brackets rotate in the backward direction (relative to the path of travel through the warewasher) causing the slide blocks to interact with the channel guides 214 and move the cradle and its dogs (not shown) backward.

Figure 13:
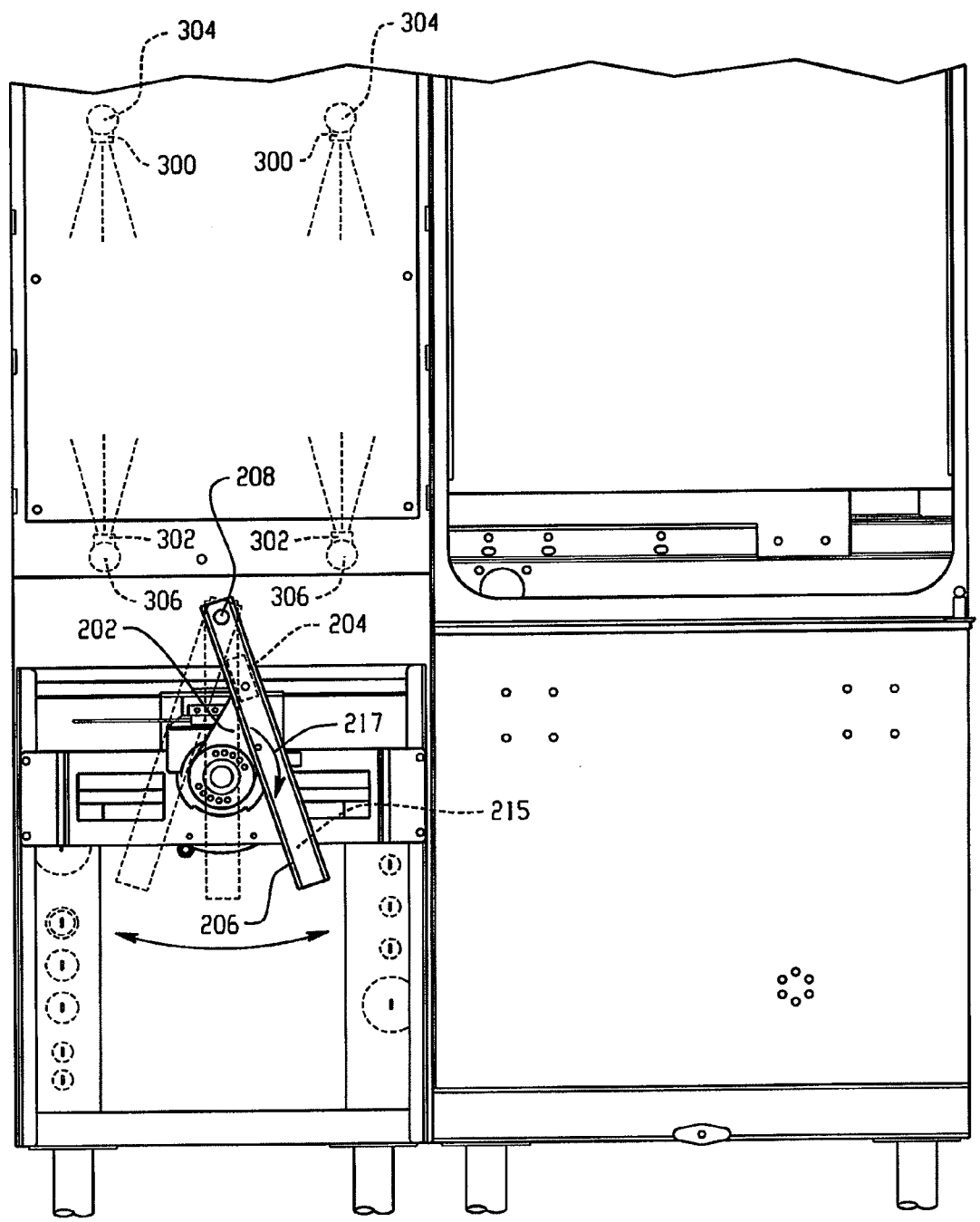

Referring more specifically to the side elevation of FIG. 13, during conveyor driving the slip clutch assembly 202 is rotated continuously in a clockwise manner at a generally constant speed. During slip clutch assembly 202 rotation, the slide block 204 moves along the length of the drive channel 206. When the slide block 204 is closest to the drive shaft 208, it causes the drive shaft to rotate more rapidly. As the slide block moves further from the drive shaft 208, the speed of rotation of the drive shaft slows. The assembly is arranged so that the drive shaft moves counterclockwise when the slide block is closest to the drive shaft, and clockwise when the slide block is furthest from the drive shaft. Thus, the cradles moves forward slower than the cradle moves backward, resulting in a rack movement curve approximated by curve 104 in FIG. 7. The drive setup is such that when the slip clutch assembly 202 is rotated, about 240 degrees of the rotation is driving and about 120 degrees is retracting. Variations on this are, of course, possible.

Figure 14:
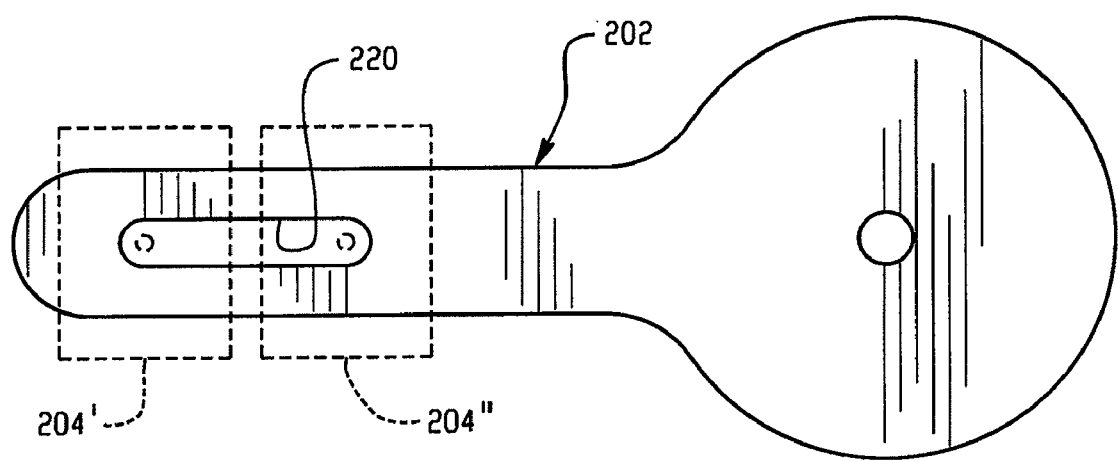
Figure 15:
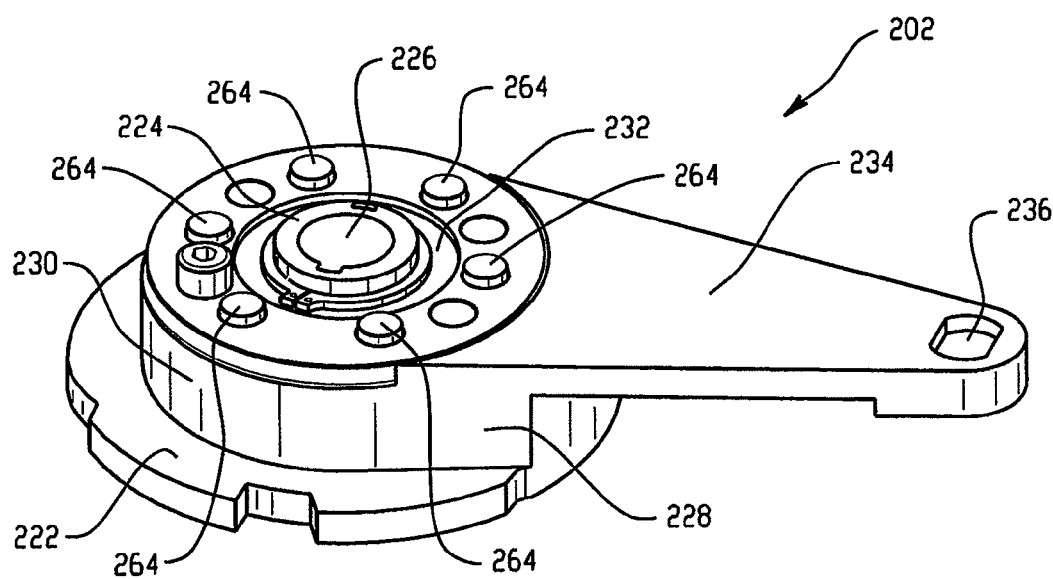
FIG. 15 is a perspective view of an embodiment of a slip clutch assembly.

Referring to FIG. 14, in order to provide for adjustability of the stroke length of cradle, the slip clutch assembly 202 may include an elongated slot 220 so that the slide block can be pivotally mounted to the crank at multiple locations along the length of the slip clutch assembly. By way of example, if a slide block is mounted with its pivot axis toward the radially outer end of the slot (as per slide block 204'), the stroke length is increased. Conversely, if a slide block is mounted toward the radially inner end of the slot (as per slide block 204"), the stroke length is decreased. This allows the drive system to be adjusted for optimization according to different style racks that have different web spacings (i.e., the stroke length can be adjusted to match the web spacing for each specific rack type).

FIGS. 15-18 illustrate the slip clutch assembly 202 in greater detail. Slip clutch assembly 202 includes a clutch plate 222 on the torque input side of the slip clutch assembly with a boss 224 extending upwardly therefrom. The boss and clutch plate include a bore 226 extending therethrough for use in connecting the clutch plate to a drive shaft of drive motor 200 (FIG. 8) so that the clutch plate rotates with the drive shaft of the drive motor. An arm member 228 on the torque output side of the slip clutch assembly 202 is connected to the clutch plate 222 in a slip manner. Specifically, the arm member 228 is capable of both rotating with the clutch plate 222 during a torque transferring condition and allowing the clutch plate to rotate relative to the arm member during a slipping condition as will be described below. Arm member 228 includes a housing portion 230 with an opening 232 through which the boss 224 is inserted and an arm portion 234 that extends radially outwardly from the housing portion. At a distal end of the arm portion 234, an opening 236 or other connection structure is provided (e.g., such as the slot 220 of FIG. 14) suitable for connecting the arm portion to the slide block 204.

Figure 17:
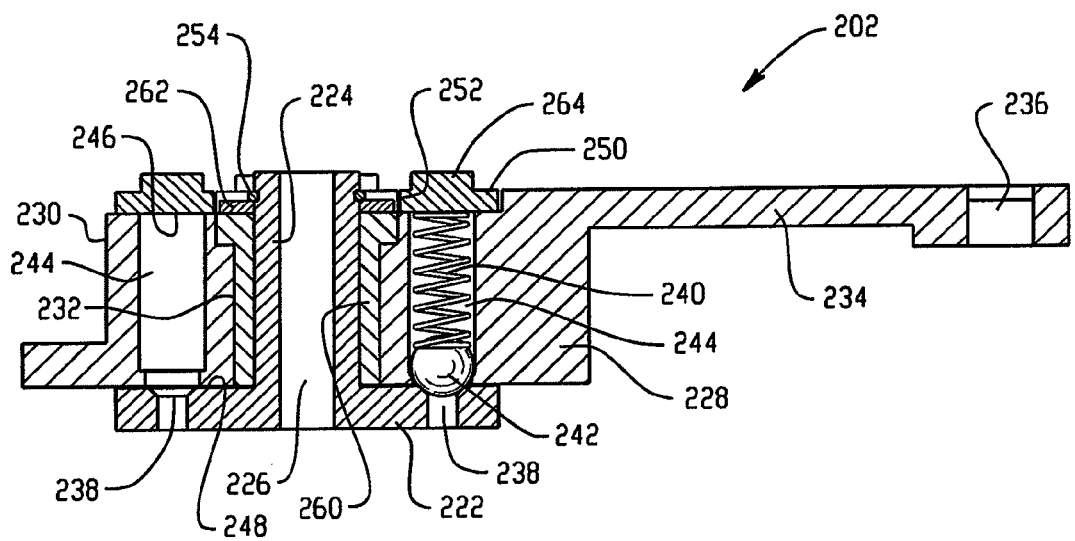
FIG. 17 is a section view of the slip clutch assembly of FIG. 16 along line A-A.
Figure 18:
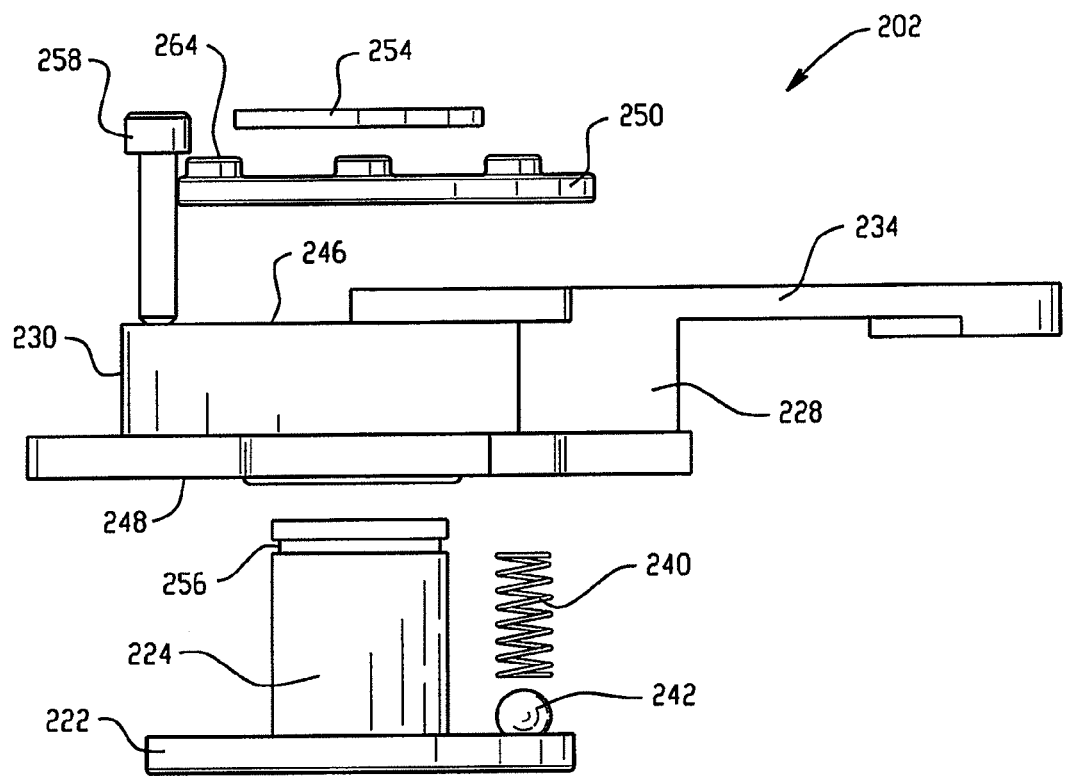
FIG. 18 is an exploded view of the slip clutch assembly of FIG. 15.

Referring to FIGS. 17 and 18, slip clutch assembly 202 further includes a releasable connecting structure, in this embodiment, in the form of a detent 238, a spring 240 (or other biasing member) and a ball bearing 242 (or other mating member) sized to seat within the detent. Spring 240 is located within a spring chamber 244 of the housing portion 230 and positioned to apply a biasing force against the ball bearing 242 to maintain a torque transferring condition between the clutch plate 222 and the arm member 228. Spring chamber 244 extends completely through the housing portion 230 from an outer side 246 of the housing portion to an inner side 248 of the housing portion that faces the clutch plate 222. It should be noted that while only one spring 240 and ball bearing are shown by FIGS. 17 and 18, in actuality there may be multiple springs 240 (e.g., six) in respective spring chambers 244 that bias associated ball bearings 242 spaced apart from each other and about the boss 224.

A quick change spring plate 250 allows for selective setting of slip clutch torque and helps to retain the spring 240 within the spring chamber 244. Specifically, the quick change spring plate 250 has at least two different orientations that each define a pre-selected slip clutch torque limit for the assembly. In the illustrated embodiment, the quick change spring plate has two different orientations that each define an associated pre-selected slip clutch torque limit for the assembly. As used herein, the term "slip clutch torque limit" refers to a maximum amount of torque that can be applied from the input side of the slip clutch assembly 202 to the output side of the slip clutch assembly without slip.

Spring plate 250 is positioned at the outer side 246 of the housing portion 230 and includes a central opening 252 through which the boss 224 extends (FIG. 17). The spring plate 250 may be connected directly to the housing portion 230 using fasteners 258, however, other suitable connecting arrangements are contemplated. A snap ring 254 is used to hold the slip clutch assembly 202 together, the snap ring 254 fitting within an annular recess 256 formed in the boss 234 (FIG. 18). In some embodiments, a cylindrical bushing 260 (e.g., formed of a relatively low friction material) is provided about the boss 224 (FIG. 17). A plate bushing 262 may be disposed between the cylindrical bushing 260 and snap ring 254 (FIG. 17).

FIG. 17 shows the slip clutch assembly 202 in the torque transferring condition with the ball bearing 242 seated within the detent 238 and the spring 240 applying a biasing force against the ball bearing to maintain the illustrated seated position. As can be seen by FIG. 17, in the seated position, the ball bearing 242 is used to transfer the torque from the clutch plate 222 to the arm member 228 as the clutch plate is rotated by the drive motor 200 due to the physical resistance that is provided by the detent 238 and the spring 240. As the clutch plate 222 is rotated, the ball bearing 242 will remain seated in the detent 238 as shown until the slip clutch torque limit for the illustrated configuration is reached.

Figure 19:
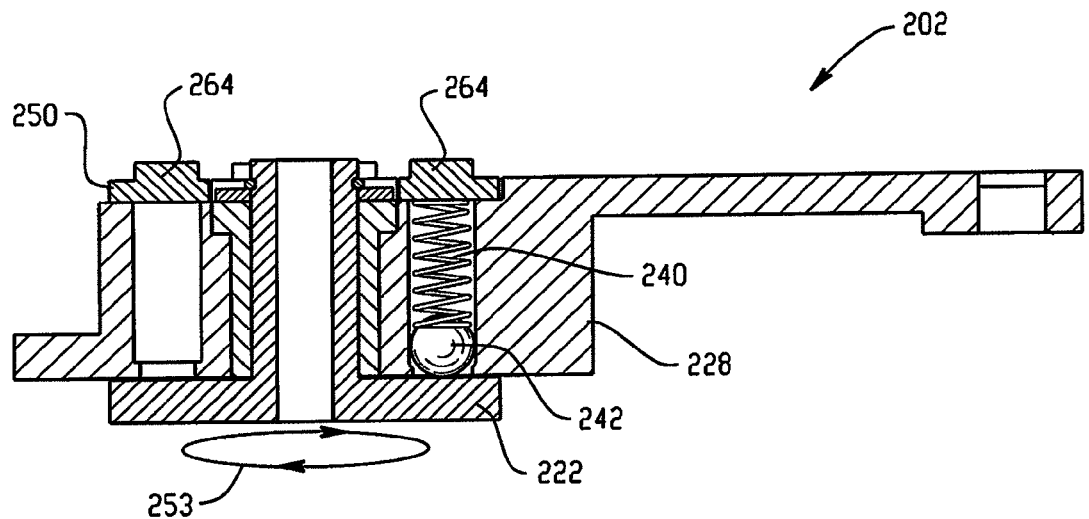
FIG. 19 is a section view of the slip clutch of FIG. 16 along line A-A with the slip clutch assembly in a slip condition.

FIG. 19 shows the slip clutch assembly 202 in the slipping condition with the ball bearing unseated from the detent 238 and sliding over the surface of the clutch plate 222 as the torque applied to the clutch plate 222 by the drive motor has exceeded the slip clutch torque limit, overcoming the physical resistance provided by the spring 240, ball bearing 242 and geometry of the detent 238. The clutch plate 222 then rotates (e.g., in the direction of arrow 253) while the arm member 228 remains relatively stationary.

As noted above, spring plate 250 allows for selective control or adjustment of the slip clutch torque limit. Spring plate 250 includes a plurality of protrusions 264 that are sized and oriented to fit into each of the spring chambers 244 (see also FIGS. 15-18). In the orientation illustrated by FIGS. 17 and 19, the slip clutch torque limit is lower as the protrusions 264 extend away from the spring chambers 244.

Figure 20:
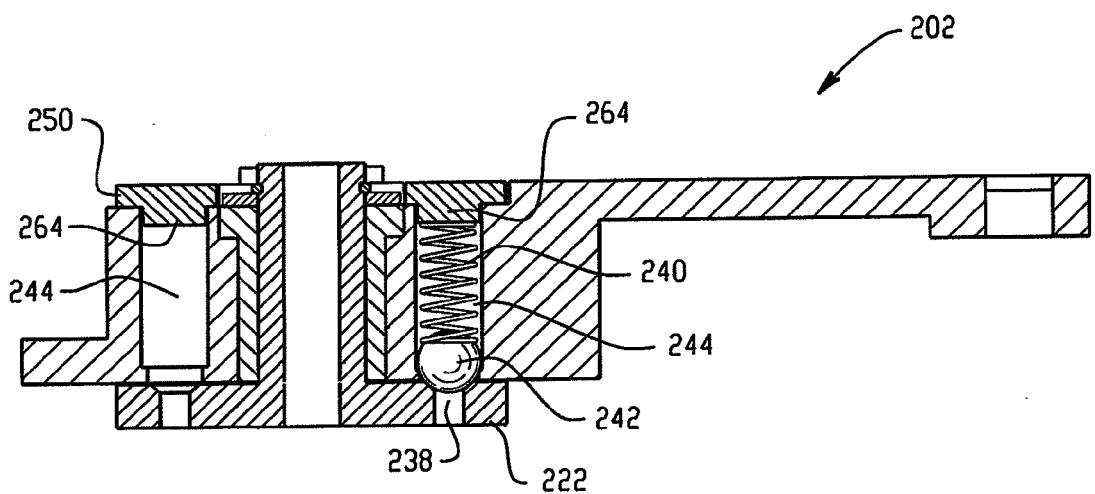
FIG. 20 is a section view of the slip clutch assembly of FIG. 18 with the spring plate flipped over to provide greater slip clutch torque.

Referring to FIG. 20, the slip clutch torque limit can be increased by flipping the spring plate 250 over and placing the protrusions 264 into the spring chambers 244. The protrusions are sized to impinge upon the springs 240 to compress the springs, which increases the biasing force applied to the ball bearings 242. This increase in biasing force also increases the slip clutch torque limit (e.g., by about 10 percent or more, such as at least about 25 percent).

Figure 5:
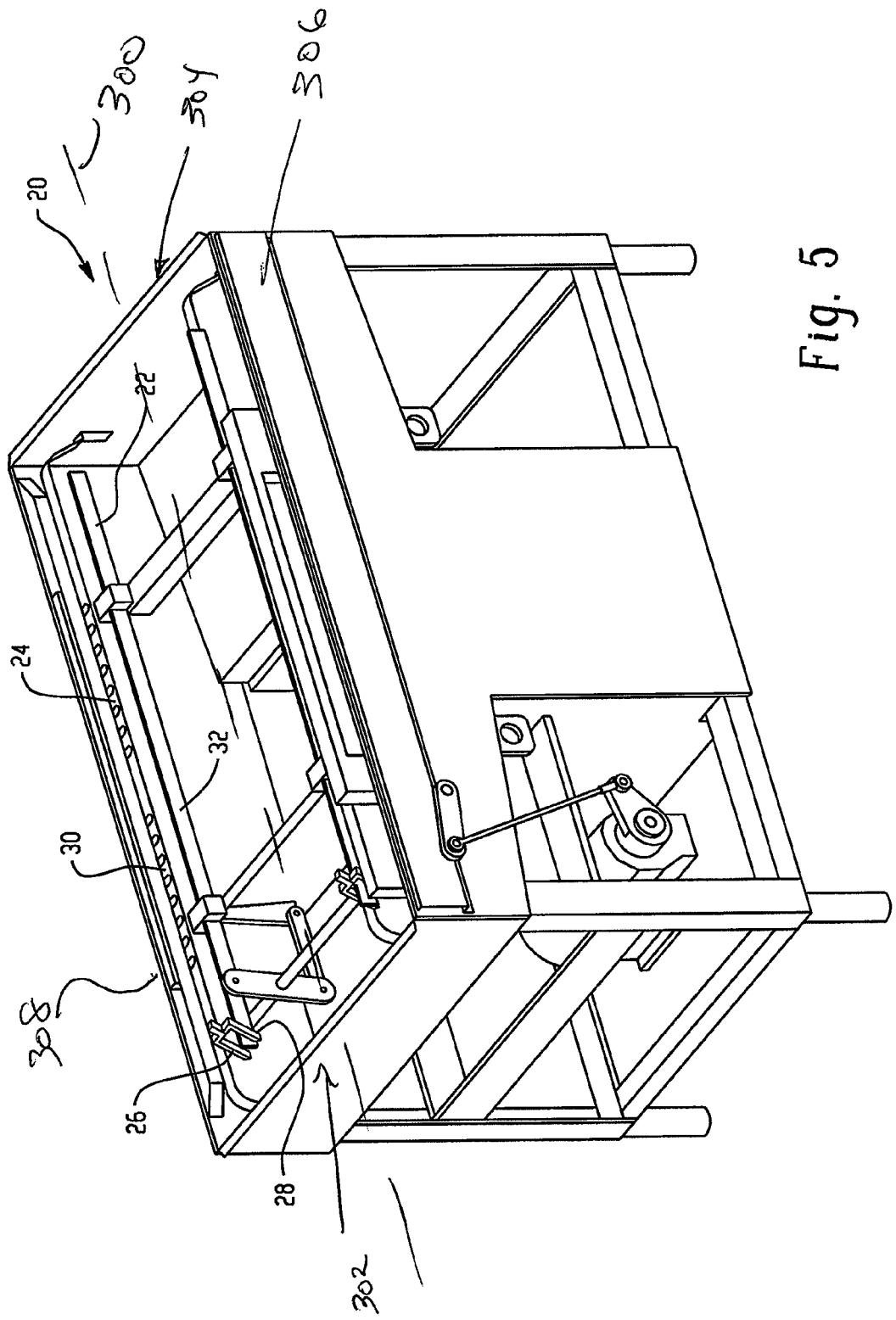
Figure 6:
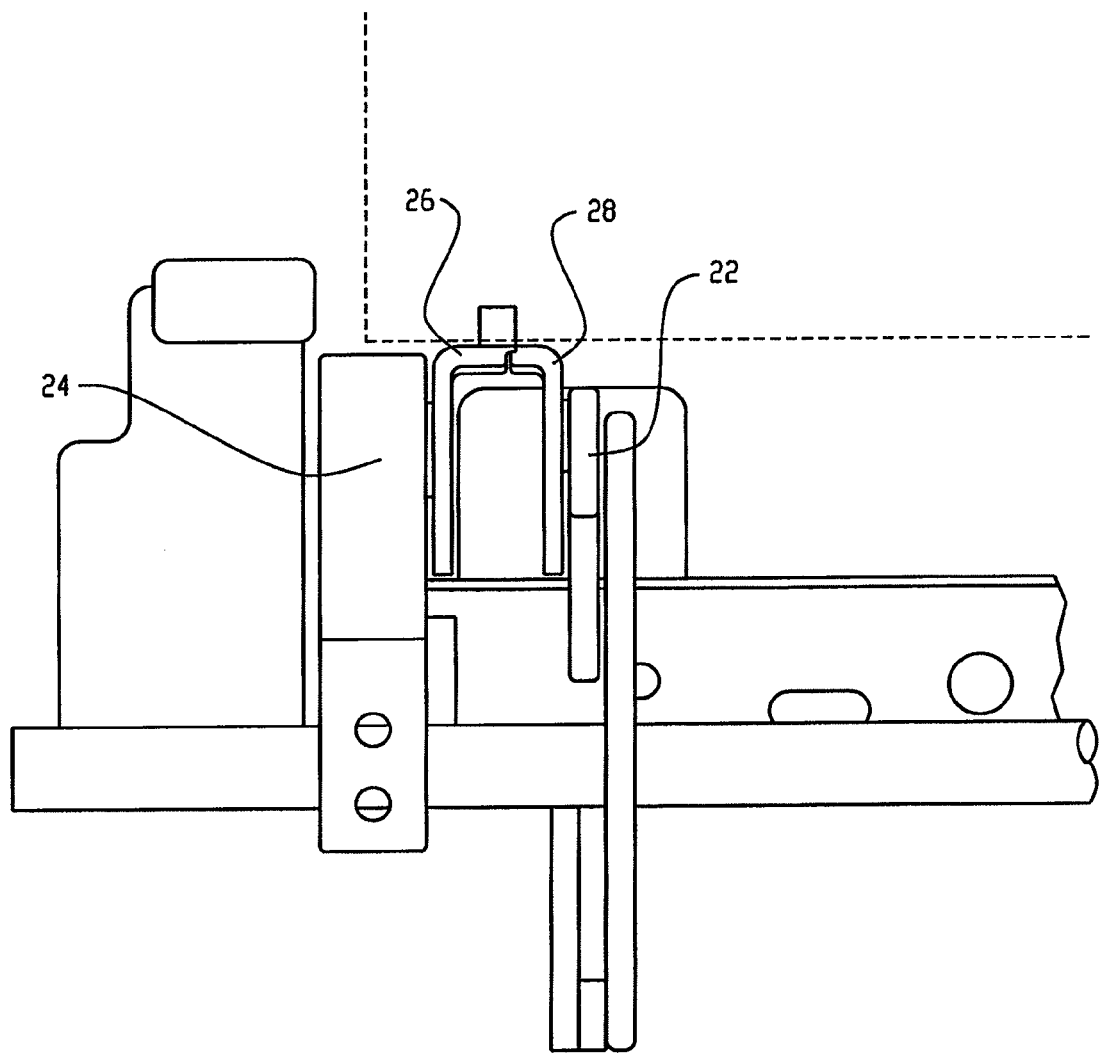

Referring to FIG. 5, a conveyor warewasher has an elongated conveyance path axis 300 that extends between an input end 302 of the warewasher and an output end 304 of the warewasher. The warewasher housing includes front, side and rear side 308.

Figure 21:
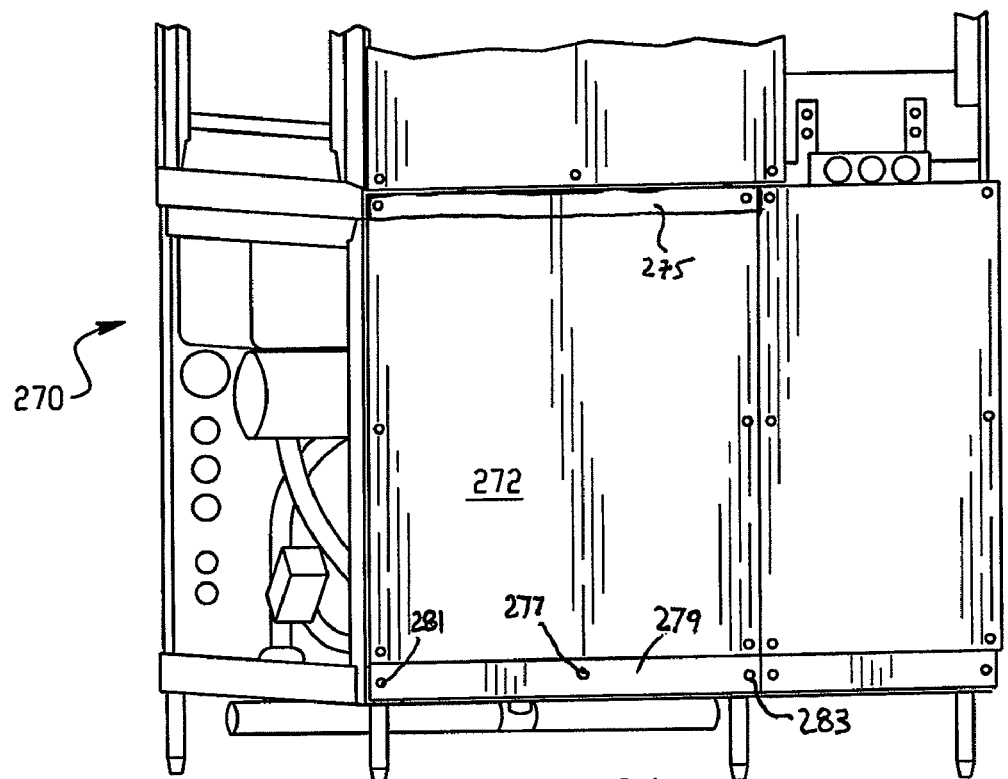
FIG. 21 is a perspective, side view of an embodiment of a warewash machine including removable side panel.

Referring now to FIG. 21, warewasher 270 including the slip clutch assembly 202 (FIG. 22) may include an easy access panel 272 (e.g., on the front side of the warewasher) that is removable to allow for operator access to the slip clutch assembly. In one embodiment, the access panel 272 tucks behind an upper holding panel 275 to hold a top portion of the front panel in place. A lower alignment opening 277 extending through a lower holding panel 279 can be aligned with a cooperating opening extending through the access panel 272 and using a tool, such as a screwdriver, the access panel can be held in position so that fasteners (e.g., bolts) can be inserted into openings 281 and 283 to secure the panel in place. To remove the access panel 272, the fasteners are removed from openings 281 and 283 and the panel can be manipulated manually from behind the upper and lower holding panels 275 and 279.

Figure 22:
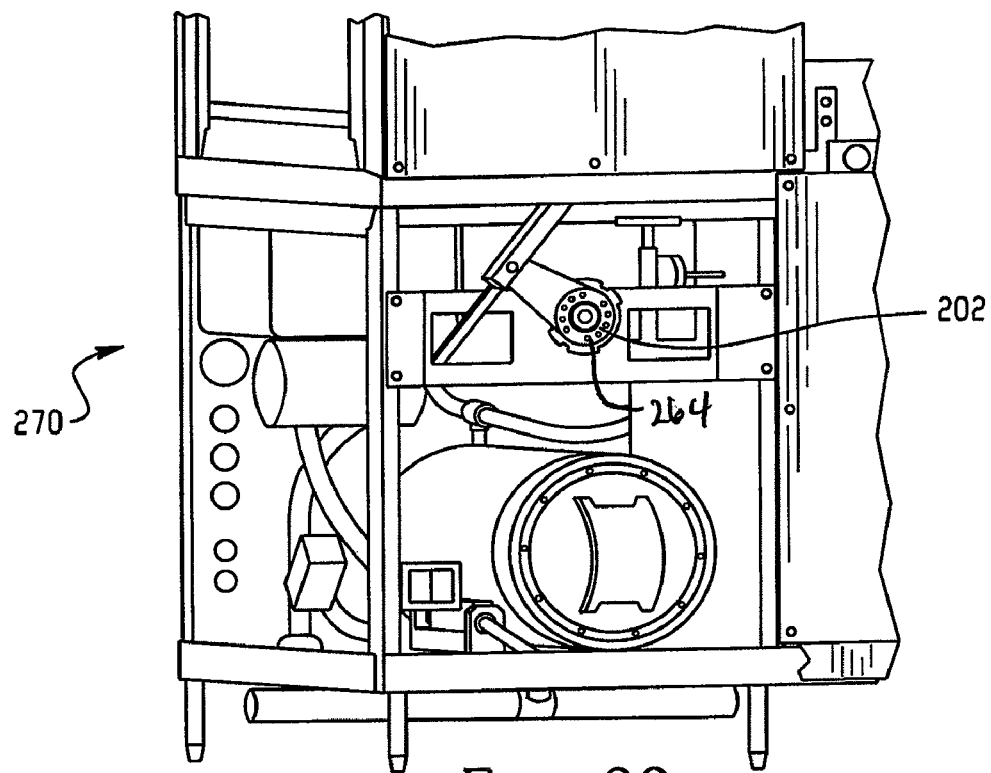
FIG. 22 is the warewash machine of FIG. 21 with the side panel removed.

Referring to FIG. 22, once the panel 272 is removed, the slip clutch assembly 202 is exposed so that, for example, an operator or service person may flip the spring plate over to either increase or decrease the slip clutch torque as described above. In FIG. 22 the side of the spring plate 250 with the protrusions 246 is facing the panel 272, thus the slip clutch assembly 202 is in lower slip clutch torque limit configuration. If the side without the protrusions 246 is facing the panel 272, the slip clutch assembly 202 is in the higher slip clutch torque limit configuration. As can now be appreciated, the quick change spring plate 250 provides the slip clutch assembly with the capability to change between multiple, different and pre-determined slip clutch torque limits in a repeatable, either/or like fashion. Additionally, an operator or service person can quickly identify which configuration the slip clutch assembly 202 is in by whether or not the projections 246 can be seen.

It is to be clearly understood that the above description is intended by way of illustration and example only and is not intended to be taken by way of limitation, and that changes and modifications are possible. For example, the slip clutch torque may be further controlled by removing springs and ball bearings or adding springs and ball bearings to empty spring chambers. The springs may have a linear or nonlinear spring constant. Accordingly, other embodiments are contemplated and modifications and changes could be made without departing from the scope of this application.

What is claimed is:

1. A warewash machine, comprising:
a housing defining at least one area for spraying liquid on wares;
a conveyance mechanism for moving wares through the housing from an input end to an output end of the housing;
a drive system for driving the conveyance mechanism, the drive system including
a drive motor having an output shaft;
a slip clutch assembly connected between the output shaft and the conveyance mechanism, the slip clutch assembly including a torque input side and a torque output side, the slip clutch assembly having a first assembled configuration and a second assembled configuration, in the first assembled configuration an adjustment member of the slip clutch assembly is positioned in a first orientation that sets a first pre-selected slip clutch torque limit and in the second assembled configuration the adjustment member is positioned in a second orientation that sets a second pre-selected slip clutch torque limit that is different than the first pre-selected slip clutch torque limit, wherein the adjustment member comprises a quick change plate that is spaced from a slip clutch plate, the quick change plate having a first side and a second side, in the first orientation the first side of the quick change plate faces toward the slip clutch plate and compresses a spring to a first level, in the second orientation the second side of the quick change plate faces toward the slip clutch plate and compresses the spring to a second level that is different than the first level.

2. The machine of claim 1, wherein the adjustment member is accessible via an access panel of the machine housing.

3. The machine of claim 2, wherein the access panel is moveable between a covering position and an access position.

4. The machine of claim 2, wherein the access panel is located on a front side of the housing.

5. The machine of claim 1, wherein the first side of the quick change plate is substantially planar and the second side of the quick change plate includes a plurality of projections.

6. The machine of claim 5, wherein when the quick change plate is in the first orientation the spring is compressed more than when the quick change plate is in the second orientation.

7. A warewash machine, comprising:
a housing defining at least one area for spraying liquid on wares;
a conveyance mechanism for moving wares through the housing from an input end to an output end of the housing;
a drive system for driving the conveyance mechanism, the drive system including
a drive motor having an output shaft;
a slip clutch assembly connected between the output shaft and the
conveyance mechanism, the slip clutch assembly including
a torque input side and a torque output side;
a clutch plate on the torque input side;
a clutch arm member on the torque output side; and
a releasable connecting structure releasably connecting the clutch arm member for rotation with the clutch plate, the releasable connecting structure including a quick change plate having first and second sides, when the slip clutch assembly is assembled with the first side of the quick change plate facing the clutch plate a first slip clutch torque limit is defined, when the slip clutch assembly is assembled with the second side of the quick change plate facing the clutch plate a second slip clutch torque is defined, the second slip clutch torque limit different than the first slip clutch torque limit.

8. The machine of claim 7 wherein the first side of the quick change plate is generally planar and the second side of the quick change plate include multiple protrusions.

9. The machine of claim 8 wherein the releasable connecting structure includes a plurality of spaced apart spring mechanisms compressible by the quick change plate, the protrusions positioned for alignment and contact with the spring mechanisms when the second side of the quick change plate faces the clutch plate.

10. The machine of claim 9 wherein the clutch arm member includes a housing portion seated adjacent a surface of the clutch plate, the housing portion including a plurality of through openings extending away from the surface of the clutch plate, each spring mechanism located within one of the through openings and compressed by the quick change plate, the quick change plate mountable to the housing portion to cover the through openings with either the first side adjacent the housing portion or the second side adjacent the housing portion, the spring mechanisms are compressed more when the second side is adjacent the housing portion than the first side is adjacent the housing portion.

11. The machine of claim 10 wherein a bearing member is positioned between each spring mechanism and the surface of the clutch plate such that the spring mechanisms bias the bearing members against the surface of the clutch plate, the surface of the clutch plate includes a plurality of detents positioned for alignment with the bearing members.

12. A method of setting up a drive system that drives a conveyor assembly of a warewash machine, the method comprising:
   linking a drive motor to the conveyor assembly through a slip clutch assembly;
   providing an adjustment member on the slip clutch assembly, the slip clutch assembly can be assembled in a first configuration with the adjustment member oriented to define a first pre-selected slip clutch torque limit, and the slip clutch assembly can be assembled in a second configuration with the adjustment member oriented to define a second pre-selected slip clutch torque limit, wherein the adjustment member comprises a quick change plate having a first side and a second side, in the first configuration the first side of the quick change plate faces toward the drive motor and compresses a spring to a first level, in the second configuration the second side of the quick change plate faces toward the drive motor and compresses the spring to a second level that is different than the first level; and
   assembling the slip clutch assembly in either the first configuration or the second configuration based upon desired slip clutch torque limit.

13. The method of claim 12 further comprising accessing the adjustment member via an access panel of the machine housing.

14. The method of claim 13 further comprising moving the access panel between a covering position and an access position.

15. The method Of claim 13, wherein the access panel is located on a front side of the housing.

16. The method of claim 12, wherein the first side of the quick change plate is substantially planar and the second side of the quick change plate includes a plurality of projections.

17. The method of claim 16 wherein when the slip clutch assembly is assembled in the first configuration the quick change plate compresses the spring more than when the slip clutch assembly is assembled in the second configuration.

* * * * *